(12) United States Patent
Patberg et al.

(10) Patent No.: US 10,894,521 B2
(45) Date of Patent: Jan. 19, 2021

(54) BUMPER FOR A VEHICLE

(71) Applicants: THYSSENKRUPP STEEL EUROPE AG, Duisburg (DE); thyssenkrupp AG, Essen (DE)

(72) Inventors: Lothar Patberg, Moers (DE); Clemens Latuske, Düsseldorf (DE); Christina Ehling, Dortmund (DE); Rolf Roettger, Mülheim a. d. Ruhr (DE); Martin Kibben, Dinslaken (DE)

(73) Assignees: ThyssenKrupp Steel Europe AG, Duisburg (DE); thyssenkrupp AG, Essen (DE)

( * ) Notice: Subject to any disclaimer, the term of this patent is extended or adjusted under 35 U.S.C. 154(b) by 283 days.

(21) Appl. No.: 16/067,883

(22) PCT Filed: Jan. 10, 2017

(86) PCT No.: PCT/EP2017/050367
§ 371 (c)(1),
(2) Date: Jul. 3, 2018

(87) PCT Pub. No.: WO2017/125278
PCT Pub. Date: Jul. 27, 2017

(65) Prior Publication Data
US 2020/0262371 A1    Aug. 20, 2020

(30) Foreign Application Priority Data

Jan. 20, 2016  (DE) .................. 10 2016 200 676

(51) Int. Cl.
*B60R 19/03*    (2006.01)
*B29C 45/14*    (2006.01)
(Continued)

(52) U.S. Cl.
CPC .............. *B60R 19/03* (2013.01); *B29C 45/14* (2013.01); *B60R 19/18* (2013.01);
(Continued)

(58) Field of Classification Search
CPC ..................... B60R 19/03; B60R 2019/1853
(Continued)

(56) References Cited

U.S. PATENT DOCUMENTS 4,275,912 A * 6/1981 Bayer .................. B60R 19/18
293/120
7,959,197 B2 * 6/2011 Agrahari ............... B60R 19/34
293/102
(Continued)

FOREIGN PATENT DOCUMENTS

CN    1509239 A    6/2004
CN    101346259 A    1/2009
(Continued)

OTHER PUBLICATIONS

English Translation of International Search Report issued in PCT/EP2017/050367, dated Mar. 21, 2017 (dated Mar. 30, 2017).
(Continued)

*Primary Examiner* — Dennis H Pedder
(74) *Attorney, Agent, or Firm* — RMCK Law Group PLC

(57) ABSTRACT

A bumper for a vehicle, including at least one profile, in particular an open profile, from a first material, having at least one ribbed structure formed from ribs from a second material, the ribbed structure being disposed along the profile at least in portions and at least in portions being connected to the profile in a force-fitting, form-fitting and/or materially integral manner in order for the profile to be reinforced. The bumper meets the requirements set in the event of collision loads and can be optimized in terms of load is achieved in that the ribbed structure is formed from
(Continued)

fiber-reinforced plastic and has at least one first region and one second region, which differ from one another in terms of at least one property.

16 Claims, 2 Drawing Sheets

(51) Int. Cl.
    *B60R 19/18*     (2006.01)
    *B29K 105/06*     (2006.01)
    *B29K 705/00*     (2006.01)
    *B29L 31/30*     (2006.01)

(52) U.S. Cl.
    CPC ...... *B29K 2105/06* (2013.01); *B29K 2705/00* (2013.01); *B29L 2031/3044* (2013.01); *B60R 2019/1853* (2013.01)

(58) Field of Classification Search
    USPC .................................................. 293/120, 121
    See application file for complete search history.

(56) References Cited

U.S. PATENT DOCUMENTS

| | | | |
|---|---|---|---|
| 9,205,794 | B1 | 12/2015 | Farooq et al. |
| 2002/0149214 | A1 | 10/2002 | Evans |
| 2004/0094975 | A1 | 5/2004 | Shuler |
| 2007/0257497 | A1* | 11/2007 | Heatherington ........ B60R 19/18 293/120 |
| 2012/0025547 | A1 | 2/2012 | Haneda et al. |
| 2013/0175813 | A1 | 7/2013 | Mana |
| 2014/0191520 | A1 | 7/2014 | Jeong |
| 2015/0015006 | A1* | 1/2015 | Yabu ..................... B29C 70/345 293/120 |

FOREIGN PATENT DOCUMENTS

| | | |
|---|---|---|
| CN | 102343878 A | 2/2012 |
| DE | 3626150 A | 2/1988 |
| DE | 41 19 640 A | 12/1992 |
| DE | 196 03 954 A | 8/1997 |
| DE | 198 30 099 A | 5/1999 |
| DE | 60 2004 001 145 T | 6/2007 |
| DE | 602 25 091 T | 3/2009 |
| EP | 1426241 A | 6/2004 |
| KR | 10 2009 0 029 937 A | 3/2009 |
| KR | 20130129649 A | 11/2013 |
| WO | 2012056350 A | 5/2012 |
| WO | 2014069108 A | 9/2013 |
| WO | 2015137547 A | 9/2015 |

OTHER PUBLICATIONS

Search Report for CN Application No. 2017800075372 dated Oct. 30, 2020.

\* cited by examiner

BUMPER FOR A VEHICLE

CROSS REFERENCE TO RELATED APPLICATIONS

This application is a U.S. National Stage Entry of International Patent Application Serial Number PCT/EP2017/050367, filed Jan. 10, 2017, which claims priority to German Patent Application No. DE 10 2016 200 676.2, filed Jan. 20, 2016, the entire contents of both of which are incorporated herein by reference.

FIELD

The present disclosure generally relates to a bumper for a vehicle.

BACKGROUND

Bumpers, in particular in the front-end structure in the vehicle, in particular in the motor vehicle, have to meet high requirements in terms of safety of the vehicle occupants but also in terms of the weight and of easy replacing in the event of damage. In the event of a frontal collision the impact energy can be absorbed by way of a plastic deformation by a targeted deformation of the bumper and of the deformation elements which are preferably configured as so-called crash boxes and preferably are disposed between the bumper and the longitudinal beam of a vehicle and the vehicle can be decisively decelerated before further, in particular supporting structures such as, for example, longitudinal beams, contribute toward the further absorption of energy. The bumpers furthermore have the task of protecting supporting vehicle structures and vehicle apparatuses such as, for example, the radiator and the engine, from damage at low impact speeds. It is furthermore the objective in automotive construction to reduce the vehicle weight in order to lower the emission of $CO_2$ Bumpers of the generic type are known from the prior art.

With the introduction of the RCAR and the post test collision load events vehicles are scored in terms of their safety, offering the consumer transparency relating to the safety classification of a vehicle, in particular of a motor vehicle.

For example, a cross beam as a bumper for a motor vehicle, which comprises an open profile from a plastics material having a ribbed structure formed from ribs from plastics material for reinforcement is disclosed in the Korean first and unexamined publication 10 2009 0 029 937 A, said ribbed structure being disposed completely along the profile and being connected to the profile. In order for the rigidity to be increased at a simultaneously low weight the teaching proposes that a braided steel structure is provided within the profile. This type of construction can meet the requirements set for collision load events, but there is further improvement potential in particular in terms of a load-optimized layout.

Thus a need exists for a bumper which meets the requirements set for the collision load events and as compared to the prior art can be conceived so as to be more optimized in terms of load.

DETAILED DESCRIPTION

Figure 1:
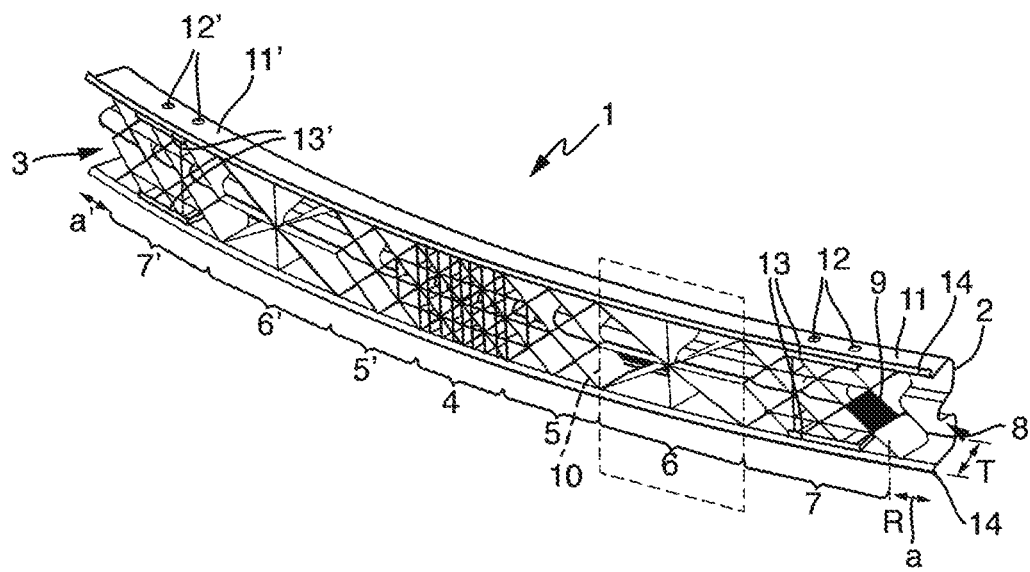
FIG. 1 is a perspective view of a first exemplary embodiment of a bumper for a vehicle.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a bumper for a vehicle, including at least one profile, in particular an open profile, from a first material, having at least one ribbed structure formed from ribs from a second material, the ribbed structure being disposed along the profile at least in portions and at least in portions being connected to the profile in a force-fitting, form-fitting and/or materially integral manner in order for the profile to be reinforced.

In some examples, the ribbed structure is formed from a fiber-reinforced plastics material and has at least one first and one second region which differ from one another in terms of at least one property.

According to the invention, the bumper for a vehicle comprises at least one profile from a first material, in particular an open profile having at least one ribbed structure formed from ribs from a second material, said ribbed structure being disposed along the profile at least in portions and at least in portions being connected to the profile in a force-fitting, form-fitting and/or materially integral manner, preferably being integrated in the open profile, in order for the profile to be reinforced. The ribbed structure is composed of a fiber-reinforced plastics material having at least one first region and one second region which differ from one another in terms of at least one property. The ribbed structure thus has at least two regions having dissimilar properties which can be adapted individually and so as to be adjusted to the load, in particular with a view to the various collision load events. These regions can be determined by means of a simulation and be verified in crash tests. The bumper according to the invention can thus fulfill the collision requirements with regard to the RCAR and post test load event, and can thus be conceived so as to be more adjusted to the load as compared to the embodiment in the prior art.

According to a first design embodiment of the bumper according to the invention, the property relates at least to the proportion of the fibers in the plastics material, the occupancy rate, the orientation, the width and/or the height of the ribs forming the ribbed structure in relation to one region. The proportion of the fibers in the plastics material (ribs) in one region refers to the volumetric proportion of the fibers within the plastics material. The occupancy rate of the ribs in one region refers to the area occupied with ribs (plastics material) in relation to the complete area of the region, that is to say that the ribs (plastics material) in relation to the region can occupy an area between >0% and <100%, wherein the area at 100% would be completely filled with plastics material. The orientation of the ribs in one region refers to the pattern of the ribs which can be configured in various manners, for example from a structure assembled from a plurality of ribs, wherein the ribs are mutually disposed at an angle, can intersect and on account thereof can form a multiplicity of polygons, can be disposed in a star-shaped manner and/or can assume further design embodiments, in particular also combinations of the above. The width of the ribs in one region refers to the rib width, or to the material thickness of the rib(s), respectively, which can be between 0.2 and 10.0 mm, in particular 0.7 and 8.0 mm, preferably 0.8 and 6.0 mm, particularly preferably 1.0 and 5.0 mm, for example. The height of the ribs in one region refers to the rib height, thus to the length of the ribs perpendicularly to the surface of the profile, this in regions potentially corresponding at most to the depth of the profile. The mechanical properties, in particular the rigidity and the strength and associated therewith the resilience of the bumper can be influenced in a targeted manner in regions by way of the aforementioned properties, in each case individually or in combination.

According to a further design embodiment of the bumper according to the invention, the ribbed structure extends substantially completely along the profile, wherein the ribbed structure in a first region which is disposed in the central portion of the profile has a higher rigidity than in a second region that is directly adjacent to the first region. The substantially complete extent along the profile comprises at least in part those regions in which in each case at least one deformation element (crash box) configured for linking the bumper to the body of a vehicle is connectable. The ribbed structure preferably extends even further and is completely present in the region for linking to the deformation elements. The ribbed structure does not terminate flush with the ends of the profile, for example, but terminates at a predetermined spacing from the ends of the profile such that the end portions of the profile remain free of the ribbed structure, since the provision of a ribbed structure in this region does not contribute toward any improvement and weight can be saved by omitting said ribbed structure.

According to one preferred design embodiment of the bumper according to the invention, the property profile of the ribbed structure is distributed symmetrically along the profile and per symmetry region, thus through one half of the profile that is delimited by a symmetry plane of the profile, has at least three regions, preferably four regions, having in each case dissimilar properties. The provision of at least three regions with dissimilar properties takes into account the fact that in the event of a collision the forces acting thereon can have dissimilar effects in regions, and this can be counteracted in a targeted and flexible manner on account thereof.

According to a further design embodiment of the bumper according to the invention, the ribbed structure is composed of glass fibers, carbon fibers, aramid fibers, polyester fibers, natural fibers, recycled fibers and/or boron fibers that are embedded in a thermoplastic or thermosetting (plastics material) matrix, wherein the fiber proportion can be between 10 and 50% by volume. The mechanical properties can be influenced depending on the fiber type and the fiber volume; in particular the strength can be increased as the fiber proportion increases. Hardly any improvement in terms of an increase in strength is to be noted below 10% by volume, and a fiber proportion above 50% by volume leads to an increase in the weight with only a slight increase in strength.

According to a further design embodiment of the bumper according to the invention, the profile is an open deep-drawn profile, an open extruded profile, or preferably an open rolled profile from a metallic material, wherein in particular the cross section of the profile at least in regions is configured so as to be U-shaped, hat-shaped and/or W-shaped. The profile can furthermore be configured so as to be of consistent length or variable length. The metallic material having a substantially consistent material thickness is preferably formed to a rolled profile by roll forming in a cost-effective manner. The rolled profiles, depending on requirements, can be embodied so as to be straight or preferably bent, wherein bending can be performed inline in the roll forming station or in a separate device. Alternatively, a deep-drawing process or an extrusion process is also possible. The material thickness of the profile is between 0.5 and 6.0 mm, in particular between 0.7 and 5.0 mm, preferably between 0.8 and 4.0 mm, particularly preferably between 1.0 and 2.5 mm, for example. The thinner the choice of the material, the more potential there is for saving weight. Alternatively, a flexibly rolled material having a variable material thickness can also be used.

According to a further design embodiment of the bumper according to the invention, the ribbed structure is molded in an integral manner or as multiple pieces, said ribbed structure within the open profile being bonded in particular in a materially integral manner, preferably being adhesively bonded therein. The integral or multiple-piece ribbed structure is molded from textile planar structures, in particular in the form of non-woven or in particular as knitwear, for example as warp or weft knitted fabrics, or in particular as non-loop-forming systems, for example as cross-laid structures, braided fabrics, or woven fabrics, or alternatively from loose short fibers which are embedded in a matrix and are available, for example, as so-called organic sheets. For example, carbon fibers or particularly preferably glass fibers in a thermoplastic matrix or alternatively in a thermosetting matrix are used, wherein the prefabricated ribbed structure can be produced in a cost-effective manner as volume goods and as a module, or as modules, respectively, and can be inserted or integrated, respectively, into the profile in a load-optimized manner.

Alternatively, and particularly preferably, the ribbed structure is molded in a load-optimized manner within the profile. Back-molded profiles can be produced in a cost-effective manner at sufficiently high cycle rates by means of conventional injection-molding tools.

According to an advantageous design embodiment of the bumper according to the invention, the profile is formed from a steel material, preferably from a steel material having a moderate ductility, in particular with an elongation at break of $A_{80}>8\%$, particularly preferably $A_{80}>10\%$, so as to be able to absorb the impact energy that arises in particular in the event of a frontal collision by way of a sufficient plastic deformation. For example, the steel material, besides a moderate elongation at break, also has a moderate tensile strength of, for example, $R_m>700$ MPa, in particular $R_m$>800 MPa, preferably $R_m$>900 MPa, so as to be able to reduce the depth of intrusion as the tensile strength increases. A further positive influence on a reduction of the weight of the bumper can be achieved in that a flexibly rolled steel material, also referred to as a "tailored rolled blank" or "tailor-rolled blank" is used as the material for the profile, said flexibly rolled steel material having dissimilar material thicknesses. For example, the profile is composed of a flexibly rolled ductile cold-formed steel. An aluminum material, in particular of high strength and high ductility, can likewise be used in the production of a profile.

According to a further design embodiment of the bumper according to the invention, at least one region in the ribbed structure is foamed. This has the advantage that a higher rigidity can be achieved in a localized manner on the bumper.

According to a second aspect, the invention relates to a method for producing a bumper for a vehicle. According to a first variant, the method comprises the following steps:

providing a profile from a first material;

laying up the profile in an opened injection-molding tool;

closing the injection-molding tool and injection-molding a second material in order for at least one ribbed structure formed from ribs to be generated, said ribbed structure at least in portions along the profile being molded thereto and at least in portions being connected in a force-fitting, form-fitting and/or materially integral manner to the profile in order for the profile to be reinforced;

curing the molded material;

opening the injection-molding tool and retrieving the reinforced profile.

According to the invention, a fiber-reinforced plastics material is used as a second material, and that a ribbed structure having at least one first region and one second region which differ from one another in terms of at least one property is generated.

Back-molded profiles can be produced economically at sufficiently high cycle rates in conventional injection-molding tools, said profiles being able to be used as bumpers and being conceived in a load-optimized manner.

According to a second variant, the method comprises the following steps:

providing a profile from a first material;

providing at least one ribbed structure formed from ribs from a second material, wherein the ribbed structure is formed from a fiber-reinforced plastics material and has at least one first region and one second region which differ from one another in terms of at least one property; and disposing the ribbed structure along the profile at least in portions, and at least in portions connecting the latter in a force-fitting, form-fitting and/or materially integral manner to the profile in order for the profile to be reinforced.

The prefabricated, for example integral or multiple-piece, ribbed structure is for example provided as a module, or as modules, respectively, which as a volume product can be produced economically and be inserted, or integrated, respectively, into the profile in a load-optimized manner.

In order for the adhesion between the first material of the profile and the ribbed structure from a fiber-reinforced plastics material to be increased, according to one preferred design embodiment of the method according to the invention as per one of the aforementioned variants, a bonding agent is used, said bonding agent being applied to the first material at least on one side prior to or after the production of the profile, wherein the bonding agent is provided on the internal side of the profile.

According to a third aspect, the invention relates to a use of the bumper according to the invention in the front-end structure of a vehicle, in particular of a motor vehicle, preferably of a passenger motor vehicle. The profile in the installed state is preferably open in the travel direction. This has the advantage that the ribbed structure in the event of any load is not released from the open profile but is supported on the profile, the resistance of the bumper thus being able to be increased. Alternatively, the profile in the installed state can be open counter to the travel direction.

A first exemplary embodiment of a bumper (1) according to the invention is illustrated in a perspective view in FIG. 1. Said bumper (1) comprises a profile (2) from a first material, said profile (2) being an open deep-drawn profile, an open extruded profile, or preferably an open rolled profile from a metallic material. The cross section of the profile (2) at least in regions, preferably continuously, is configured so as to be W-shaped and in particular of consistent length. Other cross-sectional shapes are likewise conceivable. The metal material having a substantially consistent material thickness is preferably formed to a rolled profile by means of roll forming. The rolled profiles can be embodied straight or preferably bent, depending on requirements, wherein the bending can be performed inline in the roll forming station or in a separate device. The profile (2) is preferably composed of a steel material, in particular of a cold-formed steel having a moderate ductility, preferably having an elongation at break of $A_{80}$>8%, particularly preferably $A_{80}$>10%, so as to be able to absorb the impact energy that arises in particular in the event of a frontal collision by way of a sufficient plastic deformation. For example, the steel material, besides a moderate elongation at break, also has a moderate tensile strength of, for example, $R_m$>700 MPa, in particular $R_m$>800 MPa, preferably $R_m$>900 MPa, wherein in the event of a collision the intrusion depth can be reduced as the tensile strength increases. The material thickness of the profile is, for example, between 0.5 and 3.0 mm, in particular between 0.7 and 2.5 mm, preferably between 0.8 and 2.0 mm, particularly preferably between 1.0 and 1.6 mm.

The open, bent rolled profile illustrated is composed of a steel of comparatively high strength, for example of a multi-phase steel having an elongation at break of $A_{80}$>8% and a tensile strength of $R_m$>800 MPa at a material thickness between 1.1 mm and 1.4 mm, preferably of a dual-phase steel having a material thickness of 1.2 mm.

Deformation elements (not illustrated) are linked in the linking regions (11, 11') on the left and right side of the profile (2), said deformation elements by way of a preferably releasable screw connection being capable of being linked to longitudinal beams (not illustrated) of a vehicle body. The openings (12, 12') in the profile (2) serve for plugging in screws (not illustrated) for releasably connecting the deformation elements to the profile (2). On account of the releasable connection the profile (2) can be replaced in an advantageously simple manner in the case of damage. Locally integrated reinforcements (13, 13') can be provided for reinforcing the linking regions (11, 11'). In order for in particular the global rigidity of the profile (2) to be further increased, the edges/flanges (14) of the profile (2) can be canted or bent, respectively.

The bumper (1) according to the invention has at least one ribbed structure (3) formed from ribs (R) from a second material, said ribbed structure (3) being disposed along the profile (2) at least in regions and at least in regions being connected to the profile (2) in a force-fitting, form-fitting and/or materially integral manner, preferably being integrated in the profile (2), in order for the profile (2) to be reinforced. The ribbed structure (3) is formed from a fiber-reinforced plastics material and has at least one first region (4) and one second region (5, 5') which differ from one another in terms of at least one property. The ribbed structure (3) extends substantially completely along the profile (2), wherein the ribbed structure (3) in a first region (4) which is disposed in the central portion of the profile (2) has a higher strength than in a second region (5, 5') that is directly adjacent to the first region (4). On account thereof, a high resistance in relation to flexing and buckling can be advantageously achieved in the impact point in the center of the vehicle, in particular in combination with a profile (2) that is preferably open in the vehicle direction and is configured so as to be bent and symmetrical. The substantially complete extent along the profile (2) comprises at least in part the regions (7, 7') in which in each case at least one deformation element (crash box) is capable of being linked. The ribbed structure preferably extends even further and is completely present in the region (11, 11') for linking to the body. The ribbed structure (3) does not terminate flush with the ends of the profile (2), for example, but terminates at a predetermined spacing (a, a') from the ends of the profile (2) such that the end portions of the profile (2) remain free of the ribbed structure (3). The property profile of the ribbed structure (3) is distributed symmetrically along the profile (2) and per symmetry plane has at least three regions, preferably at least four regions (4, 5, 5', 6, 6', 7, 7') having in each case dissimilar properties. The provision of at least three regions having dissimilar properties takes into account the fact that in the event of a collision the forces acting thereon can have dissimilar effects in regions, and this can be counteracted in a targeted and flexible manner on account thereof, the bumper on account thereof being able to be conceived so as to be adjusted to the load. The fiber-reinforced plastics material is, for example, a thermoplastic plastics material, in particular a PA6 having a fiber proportion of, for example, 30% by volume, wherein glass fibers are used in particular. By virtue of the W-shaped cross section of the profile/rolled profile (2), the height of the ribs (R) that form the ribbed structure (3) varies in the transverse direction of the profile (2), wherein the height of the ribs (R) preferably corresponds to at most the depth (T) of the open profile (2). The dissimilar properties in terms of the occupancy rate, the orientation, and the thickness of the ribs (2) that form the ribbed structure (3) for the four regions (4, 5, 5', 6, 6', 7, 7') are listed.

| Region | Density | Orientation | Width (t) |
| --- | --- | --- | --- |
| 4 | 50% | diamond-shaped and checkerboard-shaped | 3.0 mm |
| 5, 5' | 25% | diamond-shaped | 3.5 mm |
| 6, 6' | 10% | star-shaped | 1.5 mm |
| 7, 7' | 25% | diamond-shaped and local thickening for a screw connection | 4.0 mm |

The mechanical properties, in particular the rigidity and the strength and associated therewith the resilience of the bumper, can be influenced by way of the aforementioned properties, in each case individually or in combination, in a targeted manner in regions, in particular the intrusion depth in the event of a frontal collision by way of initiating/ introducing in a targeted manner a plastic deformation in predefined regions of the profile (2) in order for the impact energy to be absorbed. A local increase of the rigidity on the bumper (1) can be additionally achieved in that if at least one region (9) in the ribbed structure (3) is foamed.

Figure 2:
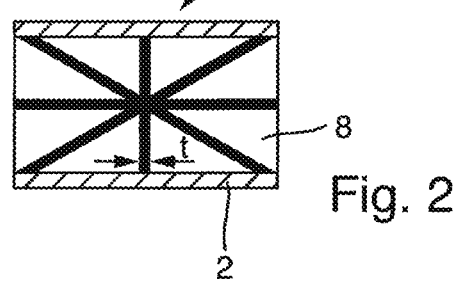
FIG. 2 is a plan view of a fragment from FIG. 1 of a region.

The chain dotted region (10) from FIG. 1 is illustrated in plan view in FIG. 2. The third region (6) which has a star-shaped orientation, a density of 10%, and a width (t) of the ribs (2) that form the ribbed structure (3) of 1.5 mm is shown. In order for the adhesion between the ribbed structure (3) and the profile (2) to be increased, a bonding agent is preferably provided on the internal side (8) of the profile (2).

Figure 3:
FIG. 3 is a schematic sequence of an exemplary embodiment of a method for producing a bumper according to a first variant.

A flow diagram of a first variant of a method according to the invention for producing a bumper (1) for a vehicle is illustrated in FIG. 3. Providing a profile (2) from a first material, in particular a deep-drawn profile or preferably a rolled profile from a metallic material which is open is performed according to step (A). Laying up the preferably open, metallic rolled profile (2) in an opened injection-molding tool is performed according to step (B). Closing the injection-molding tool and injection-molding a second material for generating at least one ribbed structure (3) formed from ribs (R) is performed in step (C), said ribbed structure being molded along the profile (2) at least in portions and at least in portions being connected to the profile (2) in a force-fitting, form-fitting and/or materially integral manner in order for the profile (2) to be reinforced. Curing the molded material is performed in step (D); subsequently opening the injection-molding tool and retrieving the reinforced profile (2) being performed in step (E). A fiber-reinforced plastics material, for example a thermoplastic injection-molding compound, preferably having loose short fibers and being provided with a fiber proportion between 10 and 50% by volume is used as a second material, and a ribbed structure (3) having at least one first region (4) and one second region (5, 5') which differ from one another in terms of at least one property is generated. Back-molded profiles (2) which are used as bumpers (1) and are conceived in a load-optimized manner can be economically produced at sufficiently high cycle rates in conventional injection-molding tools.

Figure 4:
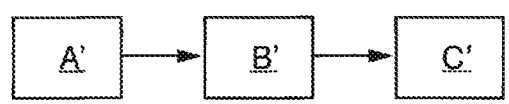
FIG. 4 is a schematic sequence of an exemplary embodiment of a first method for producing a bumper according to a second variant.

A flow diagram of a second variant of a method according to the invention for producing a bumper (1) for a vehicle is illustrated in FIG. 4. Providing a profile (2) from a first material, in particular a deep-drawn profile or preferably a rolled profile from a metallic material which is open is performed in step (A'). Providing at least one ribbed structure (3) formed from ribs (R) from a second material, wherein the ribbed structure (3) is molded integrally or in multiple pieces from a fiber-reinforced plastics material and has at least one first region (4) and one second region (5, 5') which differ from one another in terms of at least one property, is performed in step (B'). Disposing the ribbed structure along the profile (2) at least in regions and at least in regions connecting the latter to the profile (2) in a force-fitting, form-fitting and/or materially integral manner in order for the profile (2) to be reinforced is carried out in step (C'). The prefabricated integral or multi-piece ribbed structure (3) is provided, for example, as a module, or as modules, respectively, which as a volume product can be economically produced, and the profile (2) can be conceived in a load-optimized manner.

The bumper (1) as a hybrid component having preferably a rolled profile from a high-strength, ductile steel material and having a ribbed structure formed from a fiber-reinforced plastics material, in particular from a PA6 reinforced with glass fibers imparts to the bumper (1) a high strength initially at the time of impact, said high strength in particular in the center of the vehicle (impact point) initially providing a high resistance in relation to flexing and buckling. The impact energy acting thereon leads to the maximum strength of the fiber-reinforced plastics material being exceeded, said fiber-reinforced plastics material by virtue of the relatively low elongation at break thereof failing, and the further energy as a result of the plastic deformation being able to be absorbed by the high-strength, ductile steel material in a targeted manner, in particular at low intrusion depths.

Figure 5:
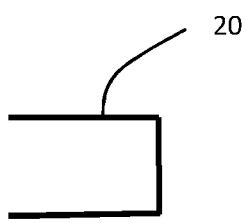
FIG. 5: shows an exemplary U-shaped profile according to one example.
Figure 6:
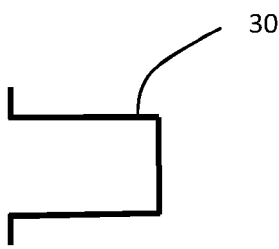
FIG. 6: shows an exemplary hat-shaped profile according to one example.

FIG. 5 illustrates an exemplary U-shaped profile 20 according to another example of the present disclosure. FIG. 6 illustrates a hat-shaped profile 30 according to yet another example of the present disclosure.

The invention is not limited to the exemplary embodiments described in conjunction with the drawing. Rather, mutual combinations are also possible within the scope of the invention. Additionally or alternatively, the bumper according to the invention can also be disposed or provided, respectively, in the rear-end structure of a vehicle so as to be able to set in a targeted manner an optimum in terms of the intrusion behavior in the direction of the passenger cabin also in the event of a rear impact.

What is claimed is:

1. A bumper for a vehicle, comprising:
   at least one profile formed from a first material, the profile being open in a travel direction of the vehicle, and
   a ribbed structure including ribs formed from a second material, said ribbed structure being disposed along at least portions of the profile and at least in portions being connected to the profile in a force-fitting, form-fitting and/or materially integral manner to reinforce the profile,
   wherein the ribbed structure is formed from a fiber-reinforced plastics material and comprising a first region and a second region that differ from one another in terms of at least one property.

2. The bumper of claim 1, wherein the at least one property relates to one or more of the proportion of the fibers in the plastics material, the occupancy rate, the orientation, and the width and/or the height of the ribs that form the ribbed structure in relation to one region.

3. The bumper of claim 1, wherein the ribbed structure extends substantially completely along the profile, wherein the ribbed structure in a first region which is disposed in the central portion of the profile has a higher rigidity than in a second region that is directly adjacent to the first region.

4. The bumper of claim 1, wherein the regions of the ribbed structure are distributed symmetrically along the profile and includes at least three regions, having in each case dissimilar properties.

5. The bumper of claim 1, wherein the ribbed structure is formed from one or more of glass fibers, carbon fibers, aramid fibers, polyester fibers, natural fibers, recycled fibers and boron fibers embedded in a thermoplastic or thermosetting matrix, wherein the proportion of fiber in the matrix is between 10 and 50% by volume.

6. The bumper of claim 1, wherein the profile is an open deep-drawn profile, an open extruded profile, or an open rolled profile and formed from a metallic material, wherein a cross section of the profile at least in regions is configured so as to be one of U-shaped, hat-shaped and W-shaped.

7. The bumper of claim 1, wherein the ribbed structure is molded in an integral manner or as multiple pieces, said ribbed structure within the open profile being bonded in a materially integral manner.

8. The bumper of claim 1, wherein the profile is formed from a metallic material and has an open profile along an entire length thereof.

9. The bumper of claim 8 wherein the metallic material is a steel material, having a moderate ductility with an elongation at break of $A_{80}>8\%$.

10. The bumper of claim 1, wherein at least one region in the ribbed structure is foamed.

11. A bumper for a vehicle, comprising:
    at least one profile formed from a first material, the profile being open along an entire length thereof in a travel direction of the vehicle, and
    a ribbed structure including ribs formed from a second material, said ribbed structure being disposed along at least portions of the profile and at least in portions being connected to the profile in a force-fitting, form-fitting and/or materially integral manner to reinforce the profile,
    wherein the ribbed structure is formed from a fiber-reinforced plastics material and comprising a first region disposed in a central portion of the profile and having a first density, a second region disposed directly adjacent to and on opposite sides of the first region and having a second density, a third region disposed directly adjacent to and on opposite sides of the second region and having a third density, and a fourth region disposed directly adjacent to and on opposite sides of the third region and having a fourth density, wherein the first density is greater than the second density, and the second and fourth density are both greater than the third density.

12. The bumper of claim 11 wherein the first density is 50%, the second density is 25%, the third density is 10% and the fourth density is 25%.

13. The bumper of claim 11 wherein (i) the first region has a diamond-shaped and checkerboard-shaped orientation, (ii) the second region has a diamond-shaped orientation, (iii) the third region has a star-shaped orientation and (iv) the fourth region has a diamond-shaped and local thickening for a screw connection.

14. The bumper of claim 11 wherein ribs of the ribbed structure in the first region have a thickness that is less than a corresponding rib in the second and fourth regions and that is greater than a corresponding rib in the third region.

15. The bumper of claim 14 wherein ribs in the first region have a thickness of 3.0 mm, ribs of the second region have a thickness of 3.5 mm, ribs of the third region have a thickness of 1.5 mm and ribs of the fourth region have a thickness of 4.0 mm.

16. The bumper of claim 11 wherein the profile has a cross section that is continuously W-shaped and wherein a height of the ribs that form the ribbed structure varies in a transverse direction of the profile by virtue of the W-shaped profile.

* * * * *